United States Patent [19]

Aslin

[11] Patent Number: 4,795,561
[45] Date of Patent: Jan. 3, 1989

[54] SELF REGULATING CYCLONIC SEPARATOR

[75] Inventor: David J. Aslin, Norristown, Pa.
[73] Assignee: Aeroquip Corporation, Jackson, Mich.
[21] Appl. No.: 9,664
[22] Filed: Jan. 23, 1987
[51] Int. Cl.$^4$ ............................................ B01D 45/12
[52] U.S. Cl. ................................ 210/512.1; 55/164; 55/204; 209/211
[58] Field of Search .............. 55/204, 205, 218, 219, 55/164–170, 191, 184, 459 R, 432, 417; 209/211; 210/512.1; 137/431, 433, 192

[56] References Cited

U.S. PATENT DOCUMENTS

| | | | |
|---|---|---|---|
| 1,566,084 | 12/1925 | Gardner | 55/432 |
| 1,761,743 | 6/1930 | Peterson | 55/168 |
| 1,799,684 | 4/1931 | Gilbert et al. | 55/169 |
| 2,976,994 | 3/1961 | Rodman et al. | 209/211 |
| 3,867,115 | 2/1975 | Heintzelman | 55/432 |

FOREIGN PATENT DOCUMENTS 542559 2/1977 U.S.S.R. ............................. 55/432

Primary Examiner—Bernard Nozick
Attorney, Agent, or Firm—Lipton & Famiglio

[57] ABSTRACT

A cyclonic separator, for use in a fluid flow system, e.g., a fluid lubrication system for a mechanical drive, comprises a housing containing an inlet, a moveble shroud, and at least one variable area outlet. The movement of the shroud and its location within the housing is determined by pressure equalization of fluid phases within the housing. Movement of the shroud causes a change in the discharge area of at least one of the outlets handling the discharge of one of the fluid phases. Changes in the discharge areas promote a more definitive "stable" interface between the two phases thereby increasing the effectiveness of separation of one phase from another. Also debris can be separated from the fluid.

18 Claims, 3 Drawing Sheets

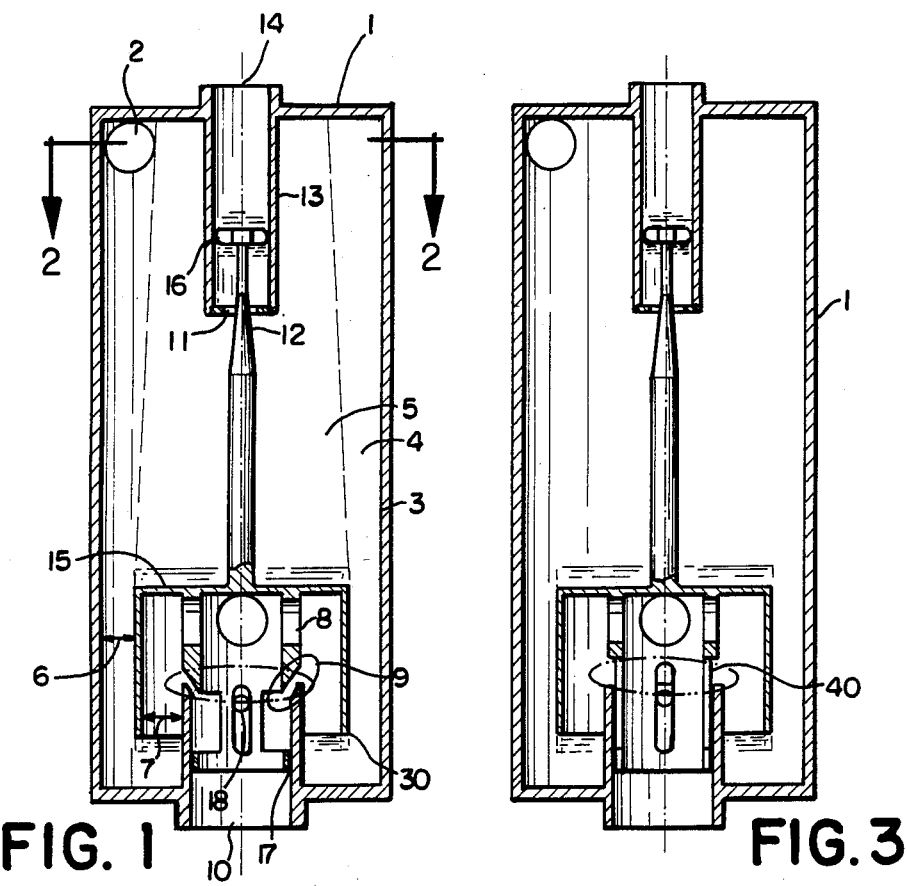
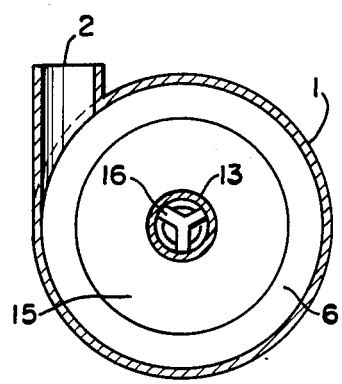
FIG. 1  FIG. 3  FIG. 2

SELF REGULATING CYCLONIC SEPARATOR

BACKGROUND OF THE INVENTION

This invention relates to a device which separates various fluid phases including immiscible liquids, e.g., oil and water; gas/liquid phases, e.g., air and oil; and three phase compositions, e.i., gas/liquid/solid, e.g., air/oil/metal particles. One example of a particularly useful separation is in a lubricating system for a gas turbine engine. Another example of a useful separation is in chemical processing in which chemical compositions are handled. Such separation systems are also applicable for transmission systems in general, and aircraft power transmissions in particular. A phase separator of this type may be combined with a particle detection system of this type which monitors certain metal particles which are normally generated by wear or mechanical problems, and which become suspended in the lubrication oil during the course of operation.

Engine lubricating systems, transmissions systems and other like systems agitate their fluids, e.g., oil and ingressed gas, e.g., air, by design, to prevent seal leakage. The result is the forming of a two phase air/oil mixture. Such dilution of the oil is obviously undesirable since it results in less oil coming in contact with the surfaces requiring lubrication thereby diminishing the lubricating effect of the oil. Other effects include increasing the necessary size of a piece of equipment, e.g., a reservoir or a heat exchanger. Additionally, the cooling effect of the oil is substantially reduced by such entrained air and may increase the probability of overheating causing accelerated wear.

Cyclonic separators for removing entrained air from oil are known in the prior art. One such device is disclosed in U.S. Pat. No. 4,282,016, issued Aug. 4, 1981, to Thomas E. Tauber, et al entitled "Gas and Failure Particle Separator System." This invention discloses a separator system combined with a particle detector wherein the oil and air entered through the top side of the device, and oil exits from the bottom of the device while the separated air exits from the top. The use of a fixed shroud is also disclosed. Cyclonic debris separators having combined filters for removing wear particles are known and such a device is disclosed in U.S. Pat. No. 4,188,443 issued to Thomas E. Tauber on Apr. 22, 1980.

A fixed shroud used in the separation of the liquid and the air is disclosed in Thomas E. Tauber's et al U.S. Pat. application Ser. No. 708,003, filed 03/04/85. This art discloses a shroud extending downward and enclosing a filter. As the oil and air mixture enter the housing tangentially via an inlet, the heavier oil coalesces outwardly and downward passed the shroud. After the oil reaches the bottom edge of the shroud, it then proceeds upwards under the shroud and flows into a filter. The advantage of the shroud is it substantially reduces the possibility of the passage of any air through the filter.

However, the previously described shroud's efficiency depends, in part, on the location of the interface between the liquid and gas phases. When the interface does not generally coincide with the downward wall of the fixed shroud, the efficiency is less than desirable. Also, the prior art does not disclose an adjustable discharge area for either outlet.

SUMMARY OF THE INVENTION

The present invention provides a cyclonic separator useful in a fluid flow system. The fluid flow system can be, e.g., a fluid lubrication system for a mechanical drive. The separator can process fluid phases including immiscible liquids, a gas/liquid mixture, or a gas/liquid/solid mixture.

The present invention provides a separator which separates, e.g., air from oil, more efficiently over a wide range of flow rates. The separator has a configuration comprising an internal floating shroud means. The aforementioned means of this invention provides an improved method for combating the inherent inability of the conventional fixed cyclone to produce two relatively pure product streams. Due to the fact that the internal floating shroud means is hydrostatically balanced by the gas/liquid interface, it permits the formation of a more stable interface between, e.g., liquid and gas phases. This internal floating shroud arrangement permits high separation efficiencies over a wide range of flow conditions. Also, the configuration includes means by which movement of the shroud causes a change in the discharge area of at least one of the outlets handling a separated phase. Changes in a discharge area of an outlet help maintain uniform fluid flow rates.

Accordingly, it is a primary objective of the present invention to provide an apparatus for removing, e.g., a gas from a liquid, in which the internal floating shroud enables a highly efficient separation of a gas from liquid over a wide range of flow conditions.

BRIEF DESCRIPTION OF THE DRAWINGS

The construction of the embodiment of the invention, as well as further objects and advantages, will become further apparent from the following specification when considered with the accompanying drawings in which like numerals refer to like parts therein:

FIG. 1; a schematic drawing containing the preferred embodiment of the invention;

FIG. 2; shows a section of FIG. 1, taken along the 2—2 line;

FIG. 3; a schematic drawing showing another embodiment of the invention which discloses another kind of liquid discharge cross area;

DESCRIPTION OF A PREFERRED EMBODIMENT

Figure 4A:
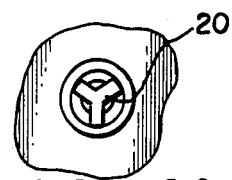
FIG. 4A; shows a view looking down onto the top of the separator shown in FIG. 4.

The following description describes the operation of the invention in terms of a liquid/gas separation. Other kinds of separations, e.g., liquid/liquid, liquid/gas/solid, work equally as well.

In FIG. 1, housing 1 includes a separator inlet connection 2, a lighter phase outlet connection 14, and a heavier phase discharge connection 10. A two phase mixture, for example, a liquid/gas, is introduced into the housing 1 via inlet 2. The liquid/gas mixture enters tangentially, is confined by the chamber wall 3, and is forced to flow downward in its outer regions. This action, coupled with the mixture's rotational motion, creates a spiraling centrifugal force field which causes the individual phases comprising the mixture to separate according to their density differences, with the heavier phase displacing the lighter phase toward the center of the separator's chamber. In the case of a liquid/liquid separator, the heavier liquid is centrifugally forced to the outer regions of the separator's chamber and the lighter fluid is displaced to the chamber's center core. In the case of a liquid/gas separator, the gas, being the lighter phase, occupies the center core of the separator's chamber. If solids, e.g., metal particles are also in the incoming mixture, then the particles tend to be centrifugally forced to the outer regions of the separator's chamber.

As the two phases separate, the heavier phase 4 proceeds downward, passed the longitudinally moveable shroud assembly 15 and through shroud assembly outside annular gap 6. After the heavier phases 4 passes the shroud assembly's edge 30, it reverses direction from downward to upward and passes through shroud assembly inside annular gap 7. The heavier phase 4 then passes through an adjustable discharge area 9 and again reverses direction to a downward movement and passes through fixed area heavier phase discharge pipe 17 into heavier phase discharge connection 10.

Some of the heavier phase can exit via a minimum area heavier phase flow opening 8. This opening 8 acts as a safety opening. If the discharge area 9 becomes closed thereby permitting no liquid to exit, opening 8 allows flow to continue, thereby avoiding a possible failure of the entire system.

As the pressure differential between the phases cause the shroud assembly 15 to rise upward toward the inlet, the discharge area 9 increases its area thereby permitting more of the heavier fluid to pass into the heavier phase discharge connection 10. If the pressure differential between the phases causes the shroud assembly 15 to retreat from the inlet the discharge area 9 decreases.

Due to the rotational motion of the phases, the shroud assembly 15 could also rotate. To prevent this rotation various means can be used. One example disclosed in FIG. 1, is a slot and pin mechanism 18 which permits the shroud assembly 15 to move longitudinal within the housing 1. The length of the slot can limit the amount of longitudinal movement.

The lighter phase 5, as it separates from the heavier phase 4, tends to concentrate in the center of the housing 1 and tends fo flow upward. FIG. 1 discloses a needle valve stem 12 which is connected at one end to the top of the shroud assembly 15 while the needle portion fits into lighter phase discharge area opening 11. The gap or area between the opening 11 and the stem 12, by longitudinal movement of the stem, is adjustable in that as the stem 12 moves downward towards the heavier phase discharge connection, the cross sectional area becomes greater. If the movement of the stem is upward, towards the lighter phase outlet, the cross sectional area decreases. The upper end of the stem 12 is attached to a star shaped support guide 16 contained within the vortex finder tube 13. The star shaped support guide helps maintain the movement of the shroud assembly in a longitudinal direction, but other supporting guide means can be employed.

Generally, then as a two phase mixture is introduced tangentially into the separator's chamber, the lighter phase tends to collect in the center whereas the heavier phase tends to migrate to the chamber's walls. The lighter phase is separated from the heavier phase and exits the separator's chamber via the vortex finder tube 13 which contains the adjustable or variable discharge area 11 and which terminates at the lighter phase outlet connection 14. The heavier phase flows down the side of the shroud assembly 15 to the bottom of the separator, where it is further confined by its chamber and forced to flow radially towards the chamber's center. The heavier phase flowing in this inward migrating stream is then forced to reverse its vertical direction of flow, which creates an inner rotating spiral which flows upward under the shroud assembly 15, through the variable discharge area 9 and out of the heavier phase discharge pipe 17, which also contains a fixed discharge area opening 8, and terminating at the heavy phase outlet connection 10.

By allowing the shroud to longitudinally move freely within the separator's chamber, a stable interface of the lighter phase and the heavier phase at the interface equals the outside diameter of the shroud assembly 15. When the floating shroud reaches a certain altitude within the separator's chamber, a hydrostatic balanced condition is achieved. The balanced condition exists when the hydrostatic pressure on the underside of the shroud assembly 15 is equal to the hydrostatic pressure on the top of the shroud assembly 15. This equilibrium increases the efficiency of the separation.

FIG. 2 is a cut away view of FIG. 1 along line 22. The relative location of certain elements described in FIG. 1 are shown. The mixture tangentially enters the inlet connection 2. The housing 1, contains the shroud assembly 15, the vortex finder tube 13 through which the lighter phase passes. The star shaped support guide 16 helps guide the lighter phase needle valve stem within the vortex finder tube 13. The heavier phase passes downward through shroud annular gap 6.

FIG. 3 discloses another embodiment of the present invention. In this embodiment, the heavier phase adjustable discharge area 40 is different than discharge area 9 shown in FIG. 1. In FIG. 3 the discharge area 40 comprises an opening which is perpendicular to the bottom of the housing 1. Thus, if the flow increases by a factor of two the discharge area increases by a factor of two.

Figure 4:
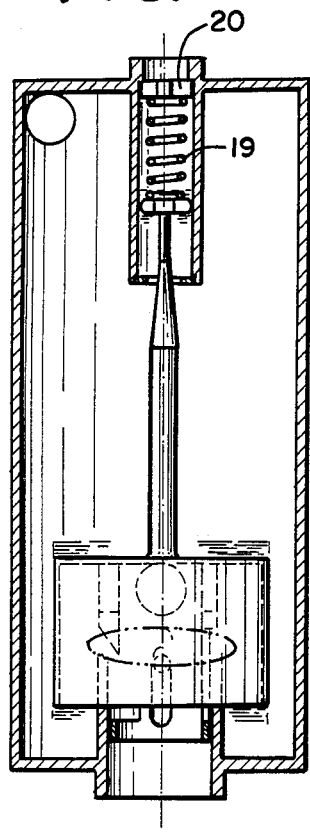
FIG. 4; a schematic drawing showing another embodiment of the invention disclosing the use of a back pressure spring mechanism.

FIG. 4 discloses another embodiment of present invention. In this embodiment, a back pressure spring mechanism 19, which is not disclosed in FIG. 1, is incorporated in the vortex finder tube 13 and is held by means 20. The mechanism 19 prevents the shroud from moving until a predetermined internal chamber pressure is reached. The spring mechanism 19 requires a certain minimum internal differential pressure and thereby obtains a better flow control.

FIG. 4A is a view looking down onto the top of the separator shown in FIG. 4 and shows a means 20 for holding the back pressure spring mechanism in the vortex finder tube.

Figure 5:
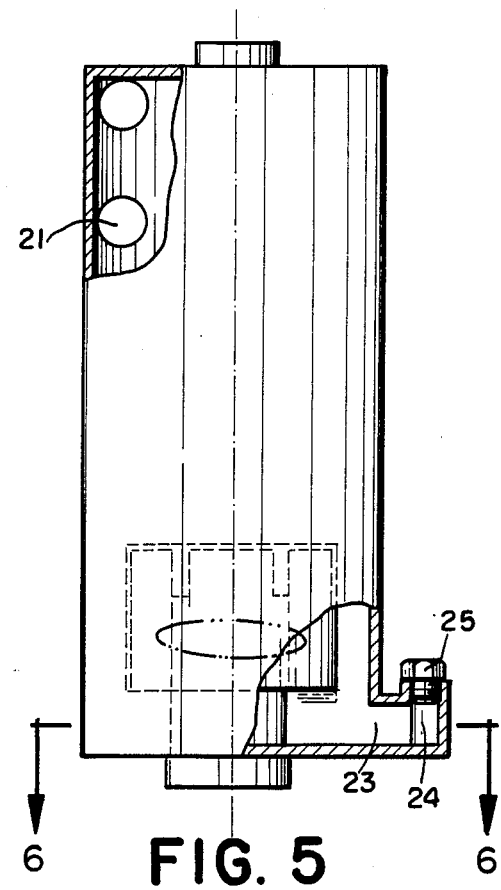
FIG. 5; a schematic drawing shows still another embodiment of the invention disclosing a wear particle collection space and a plug and two inlets.

FIG. 5 discloses an embodiment of the present invention having a second inlet 21, which is not disclosed in FIG. 1, located in the upper portion of the housing. This second inlet 21 allows a lower total inlet pressure to be used and thereby permits a smaller chamber. Additional inlets may be used with other configurations.

Also disclosed in this embodiment is a wear particle collection space 23. The collection space is accessible by a opening which is shown closed by plug 24 attached to nut head 25. in lieu of plug 24 other devies could be used including, but not limited to, a magnetic plug to attract magnetic particles, or some indicating or sensing device which measures or senses the amount of particles and sends back a signal or measurement report.

Also disclosed in the lower portion of the housing is a debris exist port 23 and a magnetic plug 24. In this embodiment the exit port 23 is shown plugged at 25. In place of the magnetic plug 24 a debris sensor (not shown) could be installed.

Figure 6:
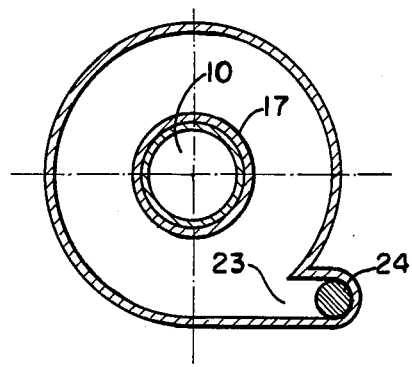
FIG. 6; shows a section of FIG. 5, shown along the 6—6 line.

FIG. 6 is a cut away view of FIG. 5 along line 6—6. The heavier phase discharge connection 17 is shown in the center of the housing and the debris exit port 23 is shown extending tangentially from the chamber's wall along with a magnetic plug 24. The purpose of the magnetic plug 24 is to retain metal particles which are carried outward by the centrifugal force. An indicating device could be used in place of the magnetic plug.

Figure 7:
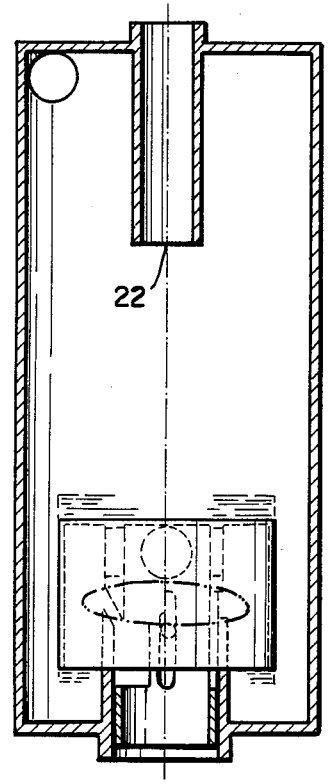
FIG. 7; a schematic drawing showing still another embodiment of the invention disclosing only one outlet having a variable cross section discharge area.

FIG. 7 shows an embodiment without a needle valve stem 12 shown in FIG. 1 for example, and the lighter phase exits through a nonadjustable discharge area 22.

The present invention can be incorporated generally into any fluid system with two or three phase flows. Within the aforementioned system the cyclonic separator separates the lighter phases, from the heavier phases, e.g., a lighter liquid from a heavier liquid, a gas from a liquid, a gas from a liquid containing a solid or a lighter liquid from a heavier liquid containing a solid. Generally, the separator comprises a housing containing a longitudinal moveable shroud and contains at least one inlet and at least two outlets. Within the housing is the means for allowing movement of the shroud and which movement also adjusts the adjustable discharge area or areas through which a separated phase and/or liquid passes. The adjustable area could be either the lighter or heavier phase or liquid outlet or both. The shroud's movement and location depends on the pressure differential across the shroud controlled by the variable discharge areas. A fluid passing through an adjustable discharge area generally exits into an outlet which can return one fluid to its use as, e.g., a lubricant, and discharge the other fluid or gas into storage or vent it.

Although the present invention has been described in particular embodiments herein set forth, it is to be understood that the present disclosure has been made only by way of example and that numerous changes in the details of construction may be resorted to without departing in the spirit and scope of the invention. Thus, the scope of the invention should not be limited by the foregoing specifications, but rather only by the scope of the following claims of the invention.

What is claimed is:

1. In a fluid system, a cyclonic separator for separating a lighter fluid from a fluid mixture comprising:
   (a) a housing containing a longitudinally movably mounted shroud and having at least one inlet and at least two outlets for permitting discharge from the separator of separated fluids; and with one of the outlets having means proximate thereto for adjusting the volume of discharge through said outlet; and
   (b) means for allowing self-movement of said longitudinally movably mounted shroud which movement serves as the means for adjusting the volume of discharge between the shroud and one outlet, which adjusts the volume of discharge, and through which a separated fluid passes.

2. A separator according to claim 1 wherein the housing includes a debris exit port for removal of any solid particles that may exist in the fluid mixture entering the separator.

3. A separator according to claim 1 in which the longitudinally movably mounted shroud has at least two surfaces perpendicular to the longitudinal direction of motion of the shroud wherein the pressure differential between the lower density and higher density fluids works on the two surfaces to cause movement of said moveable shroud.

4. A separator according to claim 1 wherein the said inlet is connected to said housing so that its center line is parallel to a line which is tangent to said housing at a point where said inlet is connected to said housing.

5. In a fluid system, a cyclonic separator for separating a lighter fluid from a fluid mixture comprising:
   (a) a housing containing a longitudinally movably mounted shroud and having at least one inlet and a lighter fluid outlet and a heavier fluid outlet and which both outlets have adjustable discharge areas; and
   (b) means for allowing self-movement of said movably mounted shroud, which movement adjusts said adjustable discharge areas through which separated fluids pass by adjusting the space between the shroud and the heavier fluid outlet and which movement simultaneously causes adjustment of the size of the lighter fluid outlet.

6. A separator according to claim 5 wherein the housing includes a debris exit port for removal of any solid particles that may exist in the fluid mixture entering the separator.

7. A cyclonic separator for separating a lighter fluid from a fluid mixture comprising:
   (a) a housing containing a longitudinally movably mounted shroud and having at least one inlet through which a fluid mixture enters tangentially and having a lighter fluid outlet and a heavier fluid outlet, with at least one of the outlets having means for adjusting its discharge area; and
   (b) means for allowing self-movement of said longitudinally movably mounted shroud which movement serves as the means for adjusting the discharge area of the at least one outlet having an adjustable discharge area through which a separated fluid passes outwardly from the housing, and wherein the lighter fluid outlet has the adjustable discharge area and wherein said housing also includes a nonadjustable discharge area for the heavier fluid, and wherein said shroud includes a needle valve stem as the means for adjusting the discharge area for the lighter fluid, and the said stem includes supporting guide means.

8. A separator according to claim 7 wherein the housing includes a debris exit port for removal of any solid particles that may exist in the fluid mixture entering the separator.

9. A separator according to claim 7 wherein said self-movement means includes back pressure means which prevents the shroud from moving until a predetermined shroud differential pressure is reached.

10. A separator according to claim 7 wherein said shroud includes means to prevent rotation of the shroud.

11. A separator according to claim 10 wherein prevention rotation means is a slot and pin mechanism.

12. In a fluid system, a cyclonic separator for separating a lighter fluid from a fluid mixture comprising:
   (a) a housing containing a longitudinally movably mounted shroud and having at least one inlet through which a mixture of lighter fluid and heavier fluid enters tangentially to the housing and a lighter fluid outlet and a heavier fluid outlet, both outlets having means for adjusting the size of the discharge areas of such outlets; and
   (b) means for allowing self movement of said longitudinally movably mounted shroud, which movement adjust said discharge areas through which separated fluids pass outwardly from the housing.

13. A separator according to claim 12 wherein the housing includes a debris exit port for removal of any solid particles that may exist in the fluid mixture entering the separator.

14. A separator according to claim 12 in which the longitudinally movably mounted shroud has at least two surfaces perpendicular to the longitudinal direction of motion of the shroud wherein the pressure differential between the lower density and higher density fluids works on the two surfaces to cause movement of said moveable shroud.

15. In a fluid system, a cyclonic separator for separating a lighter fluid from a fluid mixture comprising:
   (a) a cylindrical housing;
   (b) at least one inlet within said housing for admitting a fluid mixture;
   (c) at least two outlets within said housing for discharging fluids from said housing, with at least one of them having means for adjusting the volume of flow through said outlet;
   (d) a longitudinally movably mounted shroud within said cylindrical housing;
   (e) means for allowing self movement of said movably mounted shroud which movement serves to adjust the flow through an outlet, through which separated fluids pass, by constricting or enlarging the pathway of flow to the outlet.

16. A separator according to claim 15 wherein the housing includes a debris exit port for removal of any solid particles that may exist in the fluid mixture entering the separator.

17. A separator according to claim 15 in which the longitudinally movably mounted shroud has at least two surfaces perpendicular to the longitudinal direction of motion of the shroud wherein the pressure differential between he lower density and higher density fluids works on the two surfaces to cause movement of said moveable shroud.

18. A separator according to claim 15 wherein the separator inlet connection is so oriented that one side of the longer axis of the internal opening forming the fluid inlet is tangential to the internal cavity within the housing.

* * * * *

UNITED STATES PATENT AND TRADEMARK OFFICE
CERTIFICATE OF CORRECTION

PATENT NO. : 4,795,561

DATED : January 3, 1989

INVENTOR(S) : David J. Aslin

It is certified that error appears in the above-identified patent and that said Letters Patent is hereby corrected as shown below:

Title page:

ABSTRACT

Line 2, after the word drive, the word "comprises" should be deleted and the word "comprising" should be inserted in its stead.

Line 3, after the word a, the word "moveble" should be deleted and the word "moveable" should be inserted in its stead.

Column 1, line 56, after the word downward the word "passed" should be deleted and the word "past" should be inserted in its stead.

Column 3, line 21, after the word downward, the word "passed" should be deleted and the word "past" should be inserted in its stead.

Column 4, line 32 after the word line, the number "22" should be deleted and the line designation "2-2" should be inserted in its stead.

Column 5, line 1, the word "a" should be deleted and the word "an" should be inserted in its stead.

Column 5, line 8, the word "exist" should be deleted and the word "exit" should be inserted in its stead.

UNITED STATES PATENT AND TRADEMARK OFFICE
CERTIFICATE OF CORRECTION

PATENT NO.   : 4,795,561

DATED        : January 3, 1989

INVENTOR(S)  : David J. Aslin

It is certified that error appears in the above-identified patent and that said Letters Patent is hereby corrected as shown below:

Column 7, line 13, the word "adjust" should be deleted and the word "adjusts" should be inserted in its stead.

Column 8, line 22, the word "he" should be deleted and the word "the" should be inserted in its stead.

Signed and Sealed this

Tenth Day of July, 1990

*Attest:*

HARRY F. MANBECK, JR.

*Attesting Officer*       *Commissioner of Patents and Trademarks*